US007269947B2

(12) United States Patent
Yoshino

(10) Patent No.: US 7,269,947 B2
(45) Date of Patent: Sep. 18, 2007

(54) VIBRATION CONTROL METHOD AND VIBRATION CONTROL SYSTEM FOR FLUID PRESSURE CONTROL CIRCUIT

(75) Inventor: Kazunori Yoshino, Kobe (JP)

(73) Assignees: Caterpillar Inc., Peoria, IL (US); Shin Caterpillar Mitsubishi Ltd. (JP)

( * ) Notice: Subject to any disclaimer, the term of this patent is extended or adjusted under 35 U.S.C. 154(b) by 94 days.

(21) Appl. No.: 11/299,112

(22) Filed: Dec. 9, 2005

(65) Prior Publication Data

US 2007/0130933 A1 Jun. 14, 2007

(51) Int. Cl.
*F16D 31/02* (2006.01)
*F15B 13/04* (2006.01)

(52) U.S. Cl. ............................ 60/469; 91/429; 91/454

(58) Field of Classification Search .................. 60/461, 60/469; 91/404, 405, 429, 430, 454
See application file for complete search history.

(56) References Cited

U.S. PATENT DOCUMENTS 4,923,038 A 5/1990 Lizell
5,582,385 A 12/1996 Boyle et al.
5,732,370 A 3/1998 Boyle et al.
5,832,730 A * 11/1998 Mizui .......................... 60/469
5,943,962 A 8/1999 Birkhahn et al.
6,817,277 B2 11/2004 Yoshino

* cited by examiner

*Primary Examiner*—Michael Leslie
(74) *Attorney, Agent, or Firm*—Liell & McNeil

(57) ABSTRACT

A first fluid channel for operating an actuator and a second fluid channel for operating an actuator are connected to a boom cylinder, including a boom rod side line, a boom head side line. A first and second supply line and a first and second discharge line of each of the first and second fluid channels, respectively, are connected to first and second meter-in control valve and first and second meter-out control valves, respectively. When the boom operating lever is returned an operating position to a neutral position, a pressure vibration generated in each fluid channel for operating the actuators is detected, and respective meter-in control valves and meter-out control valves are controlled to dampen the pressure vibration in each fluid channel.

20 Claims, 7 Drawing Sheets

VIBRATION CONTROL METHOD AND VIBRATION CONTROL SYSTEM FOR FLUID PRESSURE CONTROL CIRCUIT

TECHNICAL FIELD

This disclosure relates to a vibration control method and a vibration control system for a fluid pressure control circuit for damping pressure vibrations.

BACKGROUND

In general, work machines, such as a hydraulic excavator, are equipped with various fluid pressure actuators such as hydraulic cylinders. When the fluid pressure actuators are, for example, hydraulic cylinders for actuating a front work linkage mounted on a hydraulic excavator, returning an operating lever for the hydraulic cylinders abruptly from an operating position to a neutral position interrupts oil supply or discharge for the hydraulic cylinders. This causes kinetic energy remaining in the hydraulic cylinders to generate a pressure vibration whose natural frequency is determined by the compression of the oil in oil chambers of the hydraulic cylinder or in supply or discharge channels and the inertia of a weight load acting on the hydraulic cylinders. The pressure vibration lasts for a long time until the remaining kinetic energy disappears in the form of heat loss, giving an operator an unpleasant feeling and impairing operating efficiency.

There is thus a need for a technique for quickly dampening such pressure vibrations generated in fluid pressure actuators upon returning an operating lever from an operating position to a neutral position.

The control valve disclosed in Japanese Published Unexamined Patent Application No. 13-280305, which is controlled to dampen the pressure vibration, is arranged so that the supply and discharge control for a rod side oil chamber and a head side oil chamber of a hydraulic cylinder is carried out by a single spool valve. As a result, for example, when a pressure vibration is detected in the fluid channel for operating the actuators connected to the head side oil chamber and the control valve is displaced in a direction for damping the pressure vibration, the displacement of the valve can allow oil to be supplied to and discharged from not only the head side oil chamber, but also the rod side oil chamber. When this occurs the frequency of the generated pressure vibration is not only the same at both the rod and head sides of the hydraulic cylinder, but the phase is reversed between the two sides. Hence, the displacement of the control valve for damping the pressure vibration at the head side may not be effective in damping a pressure vibration also caused at the rod side.

In addition, a front work linkage mounted on a hydraulic excavator includes a plurality of members that are coupled together in a mutually swingable manner, such as a boom whose base end is pivoted on the machine body to allow the boom to move vertically, a stick pivoted on the front end of the boom to be swingable back and forth, and the like, and hydraulic cylinders for swinging these members. When a hydraulic cylinder for one member is brought to a sudden stop in such a machine, a shock caused by the stoppage is transmitted to the hydraulic circuit of a hydraulic cylinder for another member, generating a pressure vibration in the hydraulic cylinder for another member. This results in a vibration of the entire front work linkage.

This disclosure is aimed at providing solutions to these and other problems commonly known to those skilled in the art.

SUMMARY OF THE DISCLOSURE

In one aspect a vibration control method for a fluid pressure control circuit having a plurality of actuators is provided. Fluid channels for operating the actuators are provided with meter-in control valves for controlling fluid supply to the fluid pressure actuators and with meter-out control valves for controlling fluid discharge from the fluid pressure actuators. The method includes the step of, controlling the meter-in control valves and meter-out control valves on the basis of an operation command from an operating lever to operate the fluid pressure actuators, when the operating lever for the actuators is in a operating position. The method further includes the steps of detecting a pressure vibration generated in the respective fluid channels, and dampening the pressure vibration in the respective fluid channels when the operating lever is returned from the operation position to a neutral position.

In another aspect, the present disclosure provides a vibration control system for a fluid pressure control circuit. The system includes, a plurality of fluid pressure actuators, a plurality of fluid channels connecting to the fluid pressure actuators and a plurality of operating levers, each one corresponding with a fluid pressure actuator. Also provided is a plurality of meter-in control valves and a plurality of meter-out control valves, which are arranged in the fluid channels, wherein the meter-in control valves control fluid supply to the fluid pressure actuators while the meter-out control valves control fluid discharge from the actuators. The vibration control system further includes first and second operating circuits for controlling the meter-in control valves and meter-out control valves, respectively, to operate the fluid pressure actuators on the basis of an operation command from an operating lever when the corresponding operating lever is in an operating position. The system further includes first and second vibration control circuits for controlling the meter-in control valves and meter-out control valves, respectively, to detect a pressure vibration generated in the respective fluid channels, and dampen the pressure vibration in the respective fluid channels when the corresponding operating lever is returned from the operating position to a neutral position.

In still another aspect, the present disclosure provides a work machine that includes an operator input device, at least one fluid pressure actuator, and a fluid pressure control circuit connecting with the at least one fluid pressure actuator. The work machine further includes at least one of a meter-in and a meter-out control valve disposed within the fluid pressure circuit to control a hydraulic fluid flow between the fluid pressure control circuit and the at least one fluid pressure actuator. The work machine still further includes at least one operating circuit for controlling the at least one of a meter-in and a meter-out control valve based at least in part on a command from the operator input device when the operator input device is in a operating position. The work machine still further includes at least one vibration dampening control circuit for controlling the at least one of a meter-in and a meter-out control valve based at least in part on a value indicative of a fluid pressure vibration in the hydraulic control circuit when the operator input device is in a neutral position.

DETAILED DESCRIPTION

Figure 1:
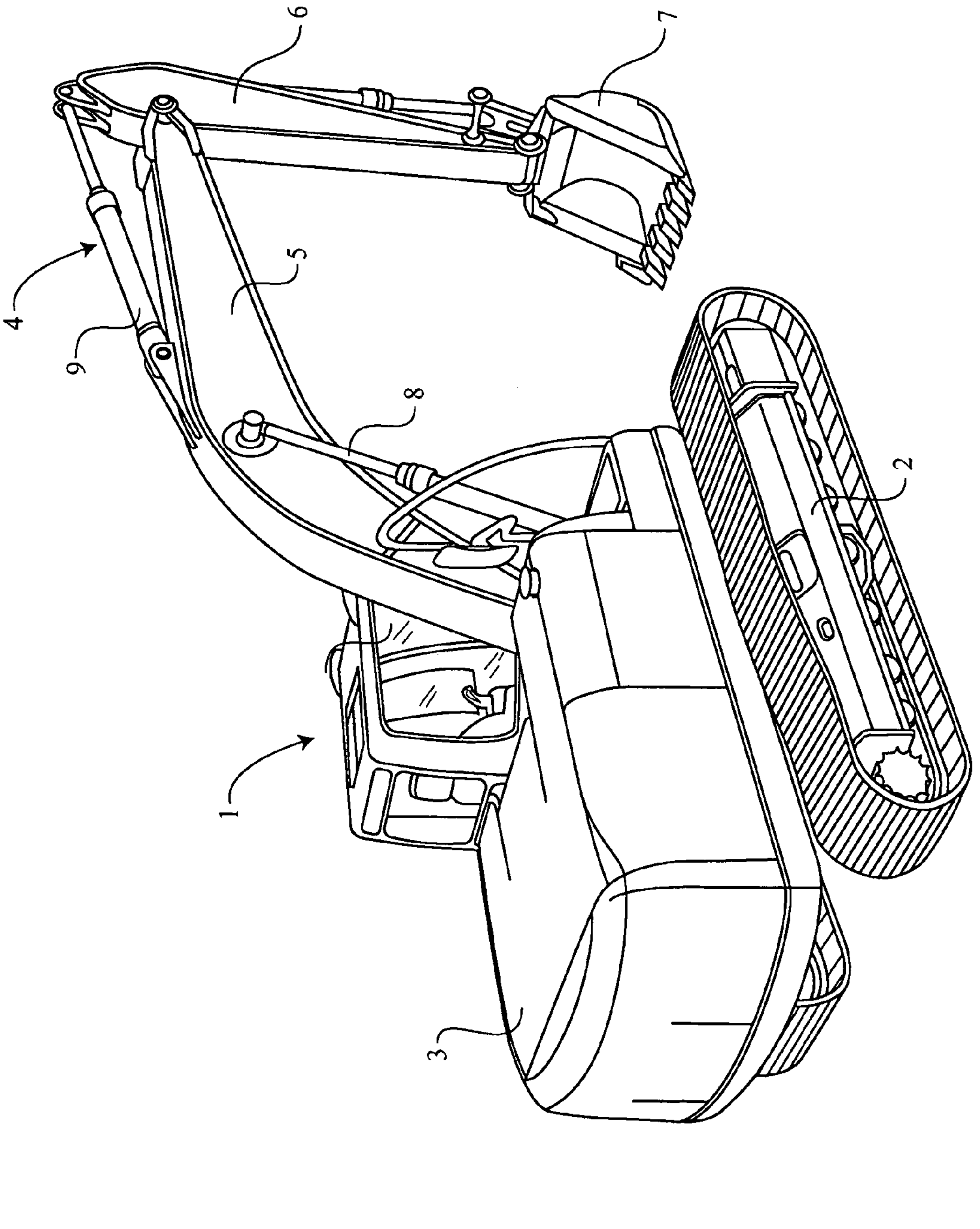
FIG. 1 is a perspective view of a hydraulic excavator according to the present disclosure.

A hydraulic excavator is shown in FIG. 1. The shovel 1 has lower traveling bodies 2 of a crawler type, an upper revolving body 3 supported revolvably on the lower traveling bodies 2, a front work linkage 4 mounted on the upper revolving body 3, and other components. The front work linkage 4 includes a boom 5, whose base end is supported on the upper revolving body 3 to allow the boom 5 to swing vertically, a stick 6 supported on the front end of the boom 5 to swing back and forth freely, and a bucket 7 fitted on the front end of the stick 6.

Figure 2:
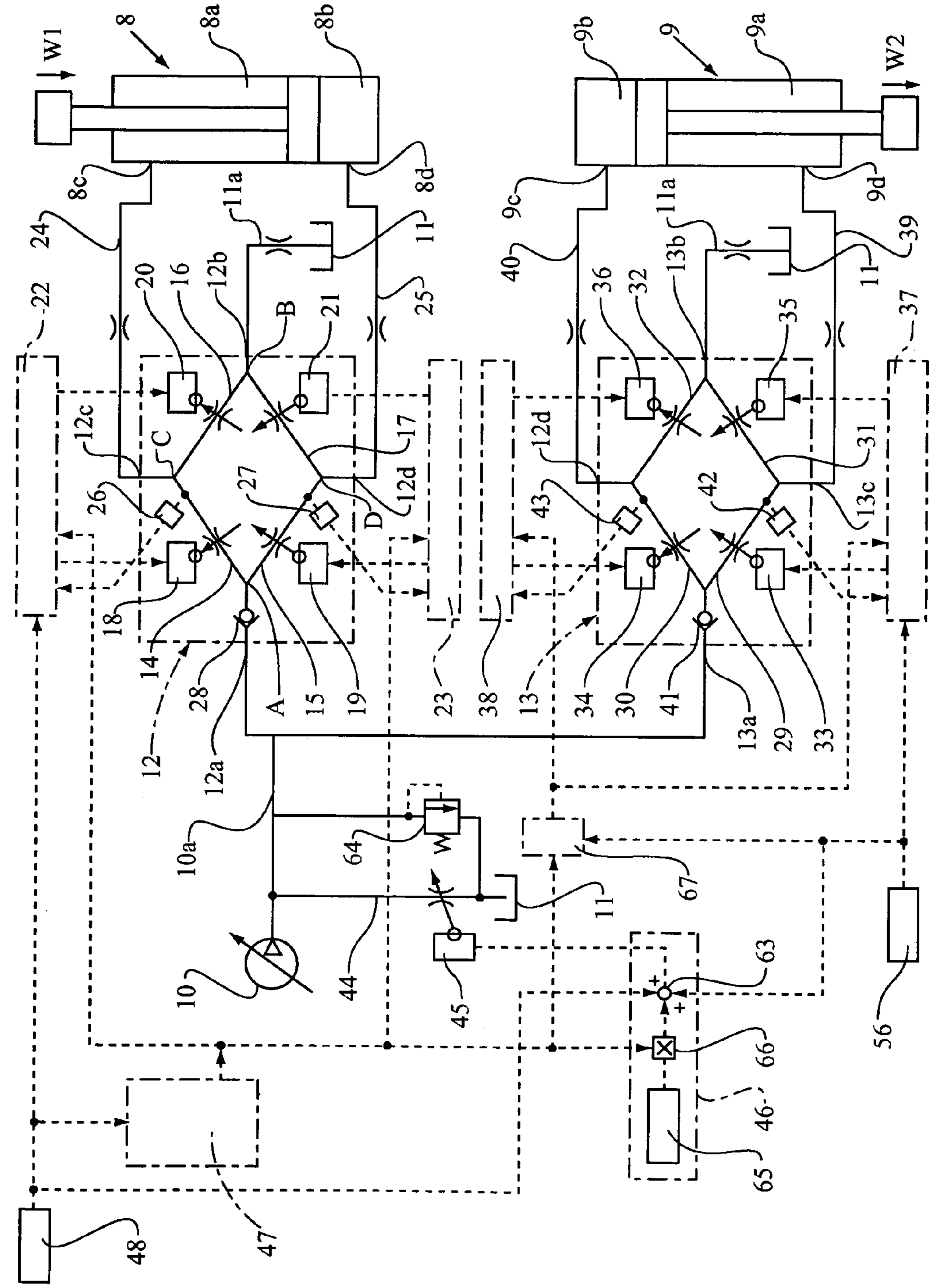
FIG. 2 is a hydraulic control circuit diagram of a boom cylinder and a stick cylinder according to the present disclosure.

FIG. 1 also shows a boom cylinder 8 for swinging the boom 5, and a stick cylinder 9 for swinging the stick 6. A hydraulic control circuit for the boom cylinder 8 and the stick cylinder 9 is shown in FIG. 2, where 10 is a hydraulic pump that acts as a pressure oil supply source for the boom cylinder 8 and stick cylinder 9. Numeral 11 is an oil tank, 12 is a boom valve unit that controls oil supply and discharge for the boom cylinder 8, and 13 is a stick valve unit that controls oil supply and discharge for the stick cylinder 9. The boom cylinder 8 actuates a weight load W1 which is the whole of the front work linkage 4, while the stick cylinder 9 actuates a weight load W2, which is from the stick 6 to the tip end side part of the inside of the front work linkage 4.

The boom valve unit 12 includes a first supply line 14, a second supply line 15, a first discharge line 16, and a second discharge line 17, all of which are connected to form a rectangular annular shape. The lines 14, 15, 16 and 17 are provided with a first meter-in control valve 18, a second meter-in control valve 19, a first meter-out control valve 20, and a second meter-out control valve 21, respectively. The first meter-in control valve 18 and the first meter-out control valve 20 operate according to a control signal output from a boom first control section 22, which will be described later, and the second meter-in control valve 19 and the second meter-out control valve 21 operate according to a control signal output from a boom second control section 23.

The boom valve unit 12 also has a pump port 12*a* connected to the hydraulic pump 10 via a delivery line 10*a*, a tank port 12*b* connected to the oil tank 11 via a tank line 11*a*, a rod side output port 12*c* that is connected to a rod side port 8*c*, which is an oil inlet-outlet on a rod side oil chamber 8*a* of the boom cylinder 8, via a boom rod side line 24, and a head side output port 12*d* that is connected to a head side port 8*d*, which is an oil inlet-outlet on a head side oil chamber 8*b* of the boom cylinder 8, via a boom head side line 25. The pump port 12*a* communicates with a connection A between the first supply line 14 and the second supply line 15. The tank port 12*b* communicates with a connection B between the first discharge line 16 and the second discharge line 17. The rod side output port 12*c* communicates with a connection C between the first supply line 14 and the first discharge line 16. The head side output port 12*d* communicates with a connection D between the second supply line 15 and the second discharge line 17.

The boom rod side line 24, the first supply line 14, and the first discharge line 16 correspond to the first fluid channel for operating the actuators according to the disclosure, while the boom head side line 25, the second supply line 15, and the second discharge line 17 correspond to the second fluid channel for operating the actuators according to the disclosure.

A first pressure detector 26 for detecting pressure vibrations is connected to the first supply line 14 in the boom valve unit 12. The pressure detector 26 is connected to the part of the supply line 14 that communicates with the boom rod side line 24 in the downstream side of the first meter-in control valve 18, and detects a pressure vibration generated in the rod side oil chamber 8*a* of the boom cylinder 8 and the boom rod side line 24. Also, a second pressure detector 27 for detecting pressure vibrations is connected to the part of the second supply line 15 that communicates with the boom head side line 25 in the downstream side of the second meter-in control valve 19. The second pressure detector 27 detects a pressure vibration generated in the head side oil chamber 8*b* of the boom cylinder 8 and the boom head side line 25. The first and second pressure detectors 26 and 27 send a detected pressure signal to the boom first and second control sections 22 and 23, respectively.

The boom valve unit 12 is further provided with a check valve 28 between the pump port 12*a* and the connection A. The check valve 28 prevents oil from flowing backward from the valve unit 12 to the delivery line 10*a*.

The stick valve unit 13 has a similar structure as the boom valve unit 12, and includes a first supply line 29, a second supply line 30, a first discharge line 31, and a second discharge line 32, all of which are connected to form a rectangular annular shape. The lines 29, 30, 31, and 32 are provided with a first meter-in control valve 33, a second meter-in control valve 34, a first meter-out control valve 35, and a second meter-out control valve 36, respectively. The first meter-in control valve 33 and the first meter-out control valve 35 operate according to a control signal output from a stick first control section 37, and the second meter-in control valve 34 and the second meter-out control valve 36 operate according to a control signal output from a stick second control section 38. The stick valve unit 13 also has a pump port 13*a* connected to the hydraulic pump 10 via the delivery line 10*a*, a tank port 13*b* connected to the oil tank 11 via a discharge line 11*a*, a rod side output port 13*c* that is connected to a rod side port 9*c*, which is an oil inlet-outlet on a rod side oil chamber 9*a* of the stick cylinder 9, via a stick rod side line 39, and a head side output port 12*d* that is connected to a head side port 9*d*, which is an oil inlet-outlet on a head side oil chamber 9*b* of the stick cylinder 9, via a stick head side line 40. The stick valve unit 13 is further provided with a check valve 41, which prevents oil from flowing backward from the valve unit 13 to the delivery line 10*a*. A first pressure detector 42 is connected to the part of the first supply line 29 that communicates with the stick rod side line 39 in the downstream side of the first meter-in control valve 33. The first pressure detector 42 detects a pressure vibration generated in the rod side oil chamber 9*a* of the stick cylinder 9 and the stick rod side line 39. Also, a second pressure detector 43 is connected to the part of the second supply line 30 that communicates with the stick head side line 40 in the downstream side of the second meter-in control valve 34. The second pressure detector 43 detects a pressure vibration generated in the head side oil chamber 9*b* of the stick cylinder 9 and the stick head side line 40. The first and second pressure detectors 42 and 43 send a detected pressure signal to the stick first and second control sections 37 and 38, respectively.

The delivery line 10*a* is an oil channel through which the pressure oil delivered from the oil pump 10 is supplied to each valve unit 12 and 13. In the middle of the delivery line 10*a*, a by-pass line 44 branches out from the oil pump 10 to directly reach the oil tank 11 without connecting to the valve units 12 and 13. The by-pass line 44 is provided with a by-pass control valve 45, which controls a flow rate in the by-pass line 44 and operates according to a control signal from a by-pass control section 46.

Figure 3:
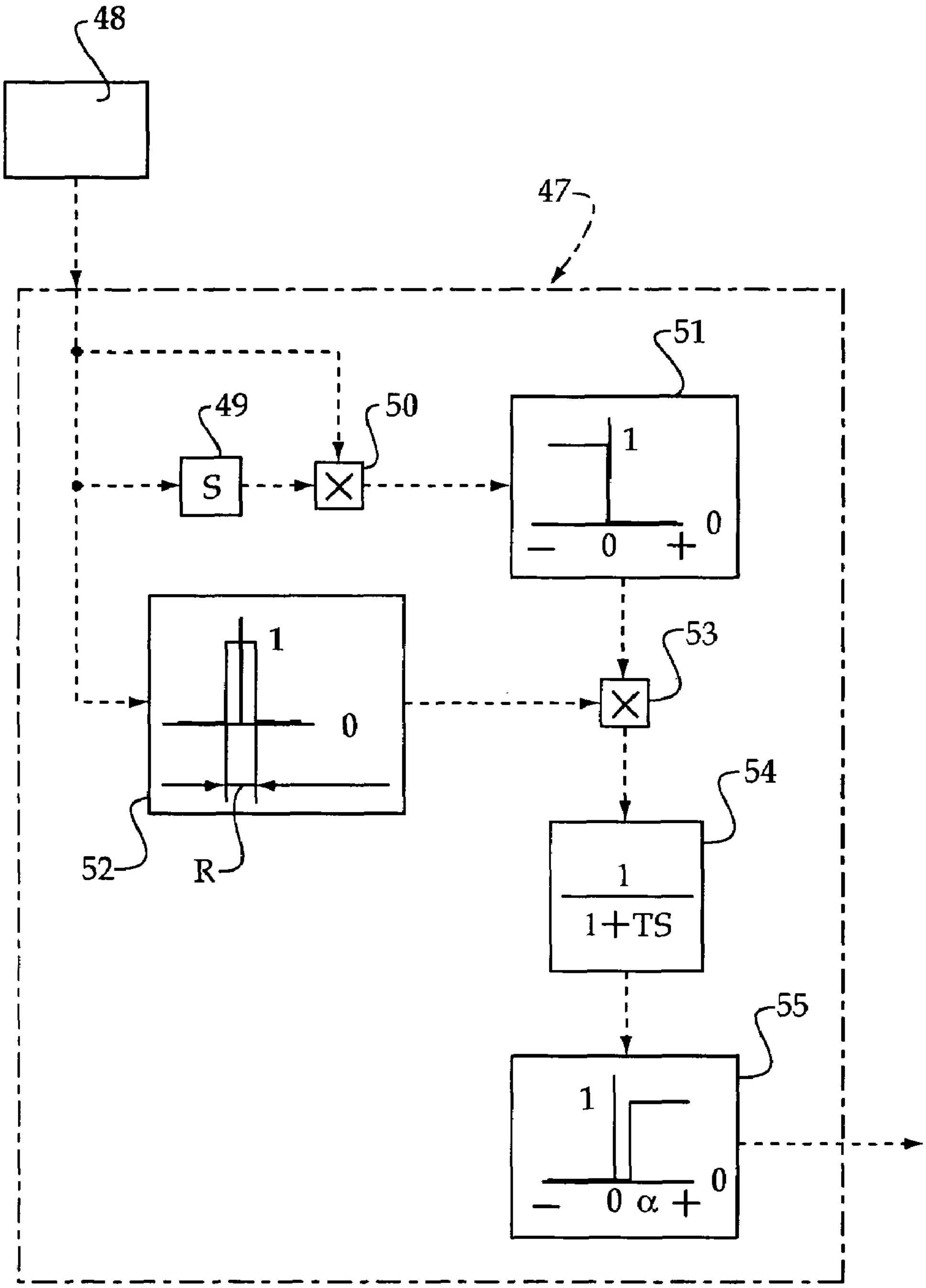
FIG. 3 is a block diagram of the trigger signal output section according to the present disclosure wherein similar elements have similar numbers to FIG. 2.

A trigger signal output section 47 generates a trigger signal according to an input signal from a boom operating lever 48. At the trigger signal output section 47, as shown in FIG. 3, a command signal value from the boom operating lever 48 (the command signal value is positive when the lever 48 is operated to the extension side and the boom 5 is lifted, and is negative when the lever 48 is operated to the contraction side and the boom 5 is lowered) is input in a differentiator 49, and an output signal from the differentiator 49 and the command signal from boom operating lever 48 are integrated at a first integrator 50. An integrated result from the first integrator 50 is then input in a first function 51, which outputs a positive logic value '1' when the output from the first integrator 50 is negative, that is the boom operating lever 48 is at the extension side or is being moved from the contraction side to the neutral side. Similarly, a negative logic value '0' is output when the output from the first integrator 50 is positive, that is the boom operating lever 48 is being moved from the neutral side to the extension side or to the contraction side. Meanwhile, a second function 52 outputs the positive value '1' when the boom operating lever 48 is in the neutral position or in a neutral dead zone R near the neutral position (in a neutral state), while outputting the negative logic value '0' when the boom operating lever 48 is being operated to the outside of the neutral dead zone R (in an operating state). Outputs from the second functions 52 and the first fuction 51 are integrated at a second integrator 53, which outputs the positive value '1' when output from the first function 51 and the second function 52 are both the positive value '1', otherwise the second integrator 53 outputs the negative value '0'. Accordingly, when an operator returns the boom operating lever 48 from the extension side or the contraction side to the neutral position and tries to stop the boom cylinder 8, the second integrator 53 outputs the positive logic value '1' in a short time and is received by a first delay element 54 momentarily. An output from the first delay element 54 is then input in a third fuction 55 which outputs the negative value '0' by default, but outputs the positive logic value '1' as a trigger signal when the output from the first delay element 54 exceeds a value a specified at the third function 55. As a result, when the operator has returned the boom operating lever 48 from the operating position to the neutral position, the positive logic value '1' is output as the trigger signal from the trigger signal output section 47 during a predetermined time T (the duration in which the output from the first delay element 54 exceeds the specified value $\alpha$, goes up to the maximum, and finally drops below the value $\alpha$) after the lever 48 is returned to the neutral position. The trigger signal is sent to the boom first and second control sections 22 and 23, to the by-pass control section 46, and to the stick first and second control section 37 and 38 as well as via a trigger signal cut section 67, which will be described later.

An operating circuit and a vibration control circuit are incorporated into the boom first and second control sections 22 and 23, and the stick first and second control sections 37 and 38, respectively. The operating circuit is for outputting an operation signal corresponding to the operation of the boom operating lever 48 and a stick operating lever 56. The vibration control circuit is for outputting a vibration control signal for suppressing a pressure vibration, which is generated in the boom and stick cylinders 8 and 9 when the boom operating lever 48 is returned from the operating position to the neutral position. Both circuits are incorporated into each control section 22, 23, 37 and 38 identically. Therefore, the operating circuit incorporated in the boom first control section 22 is described first referring to FIG. 4.

The operating circuit to be incorporated in the boom first control section 22 consists of a meter-in operating circuit and a meter-out operating circuit. The meter-in operating circuit inputs the command signal from the boom operating lever 48, to a meter-in operating signal output unit 57. When the command signal is for an operation to the contractions side, the signal output unit 57 adjusts the command signal into the signal that corresponds to an operating amount of the lever and reflects an element of the neutral dead zone R, and outputs the adjusted signal. The adjusted signal from the signal output unit 57 is then sent to a gain amplifier G1 and a first adder 58, sequentially, to be finally input in the first meter-in control valve 19 as an operating signal. Upon receiving this operating signal, the first meter-in control valve 18 opens the first supply line 14 at the opening amount corresponding to the operating amount of the boom operating lever 48.

Also, the meter-out operating circuit inputs a command signal from the boom operating lever 48 to a meter-out operating signal output unit 59. When the command signal is for an operation to the extensions side E, the signal output unit 59 adjusts the command signal into the signal that corresponds to an operating amount of the lever and reflects an element of the neutral dead zone R, and outputs the adjusted signal. The adjusted signal from the signal output unit 59 is then sent to a gain amplifier G2 and a second adder 60, sequentially, to be finally input in the first meter-out control valve 20 as an operating signal. Upon receiving this operating signal, the first meter-out control valve 20 opens the first discharge line 16 at the opening amount corresponding to the operating amount of the boom operating lever 48.

Likewise, the operating circuit in the boom second control section 23 consists of a meter-in operating circuit for outputting an operating signal to the second meter-in control valve 19, and a meter-out operating circuit for outputting an operating signal to the second meter-out control valve 21.

Accordingly, the boom cylinder 8 extends and contracts in response to the operation of the boom operating lever 48 on the basis of the operating signal output from each operating circuit which is incorporated in the boom first and second control sections 22 and 23.

In other words, when the boom operating lever 48 is in the neutral position (the predetermined time T after the boom operating lever's returning from the operating position to the neutral position is excluded), no operating signal is output from the operating circuits in the boom first and second control sections 22 and 23, thus the first and second meter-in control valves 18 and 19 and the first and second meter-out control valves 20 and 21 are all kept closed. Therefore, no oil supply or discharge for the boom cylinder 8 is carried out, which keeps the boom cylinder 8 still.

When the boom operating lever 48 is operated from the neutral position to the contraction side C, the meter-in operating circuit in the boom first control section 22 outputs an operating signal to the first meter-in control valve 18 so that the control valve 18 opens the first supply line 14 at the opening amount corresponding to an operating amount of the lever, while the meter-out operating circuit in the boom second control section 23 outputs an operating signal to the second meter-out control valve 21 as well so that the control valve 21 opens the second discharge line 17 at the opening amount corresponding to the operating amount of the lever. In response to the output signals, pressure oil delivered from the hydraulic pump 10 is supplied to the rod side oil chamber 8*a* of the boom cylinder 8 via the delivery line 10*a*, the first supply line 14, and the boom rod side line 24, while discharged oil from the head side oil chamber 8*b* is made to flow in the oil tank 11 via the boom head side line 25, the second discharge line 17, and the tank line 11*a*. Thus the boom cylinder 8 contracts.

Likewise, when the boom operating lever 48 is operated from the neutral position to the extension side, the meter-in operating circuit in the boom second control section 23 outputs an operating signal to the second meter-in control valve 19 so that the control valve 19 opens the second supply line 15 at the opening amount corresponding to an operating amount of the lever, while the meter-out operating circuit in the boom first control section 22 outputs an operating signal to the first meter-out control valve 20 as well so that the control valve 20 opens the first discharge line 16 at the opening amount corresponding to the operating amount of the lever. In response to the output signals, pressure oil delivered from the hydraulic pump 10 is supplied to the head side oil chamber 8*b* of the boom cylinder 8 via the delivery line 10*a*, the second supply line 15, and the boom head side line 25, while discharged oil from the rod side oil chamber 8*a* is made to flow in the oil tank 11 via the boom rod side line 24, the first discharge line 16, and the tank line 11*a*. In this manner, the boom cylinder 8 extends.

As in the case of the boom cylinder 8, the stick cylinder 9 also extends and contracts in response to the operation of the stick operating lever 56 on the basis of the operating signal output from each operating circuit, which is incorporated into the stick first and second control sections 37 and 38.

Figure 4:
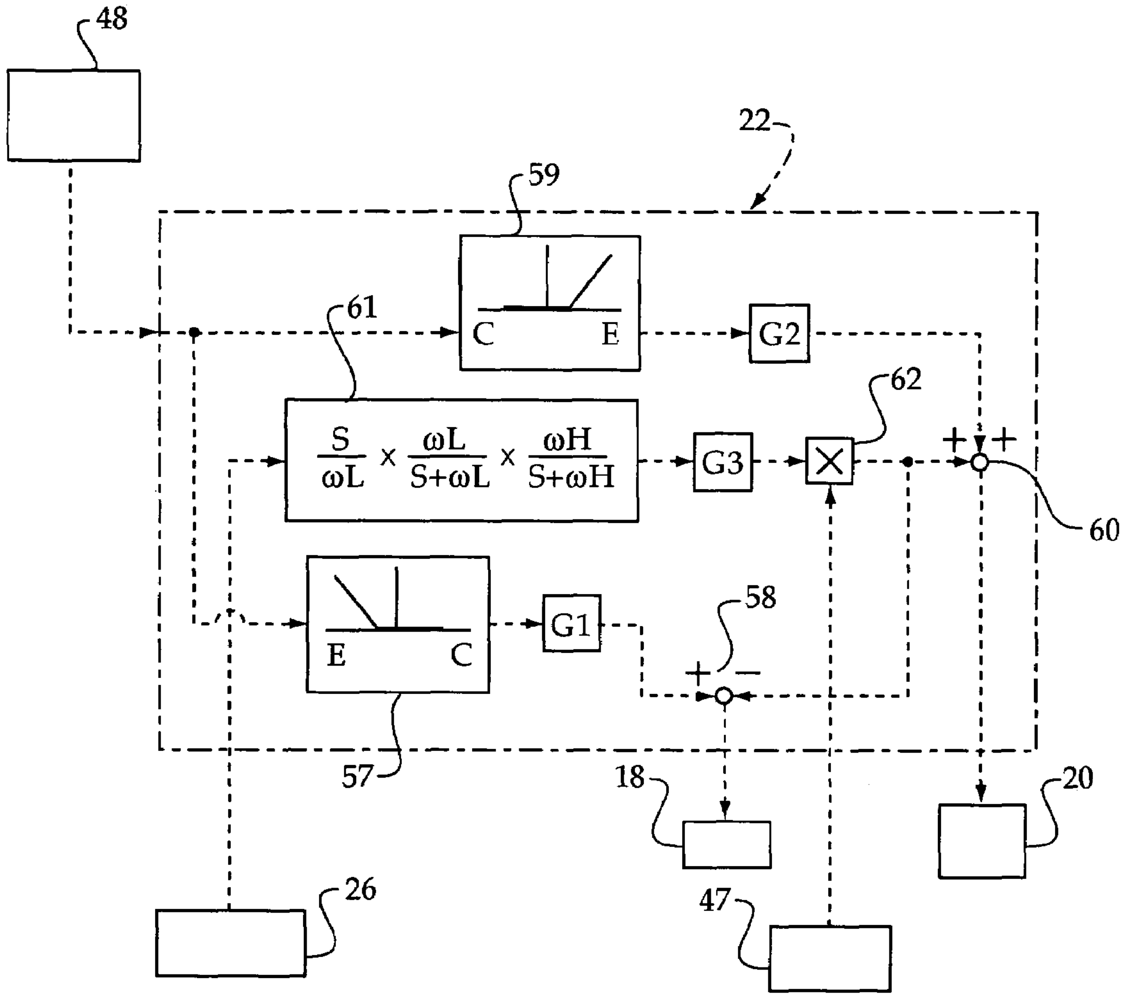
FIG. 4 is a block diagram of the boom first control section according to the present disclosure wherein similar elements have similar numbers to FIGS. 2 and 3.

Next, the vibration control circuit incorporated into the boom first control section 22 is described referring to FIG. 4. In the vibration control circuit, a pressure signal detected by the first pressure detector 26 arranged in the first supply line 14 is filtered through a band-pass filter 61. The band-pass filter 61 passes only the natural frequency of a pressure vibration generated upon stopping the operation of the boom cylinder 8 and vibratory components having frequencies around the natural frequency, while removing DC components representing a setting pressure. The symbol ωL in a transfer function represents the angular frequency of the vibratory component at the lower limit of vibratory components that have frequencies lower than the natural angular frequency and are allowed to pass the filter 61. The symbol ωH represents the angular frequency of the vibratory component at the upper limit of vibratory components that have a frequency higher than the natural angular frequency and are allowed to pass the filter 61.

A signal output from the band-pass filter 61 is then input to an integrator 62 via a gain amplifier G3. The integrator 62 integrates the output signal from the band-pass filter 61 and a trigger signal from the trigger signal output section 47. When the trigger signal is the positive logic value '1', that is during the given time T after the boom operating lever 48 is returned to the neutral position, the signal from the band-pass filter 61 itself becomes an output signal from the integrator 62. When the trigger signal is the negative logic value '0', that is in a time duration other than the given time T after the boom operating lever 48 is returned to the neutral position, the signal from the band-pass filter 61 is blocked by the integrator 62.

The output signal from the integrator 62 is input in the second adder 60 without changing the sign of the signal, and is input in the first adder 58 as well after changing the signal sign to negative. As a result, the output signal from the band-pass filter 61 that represents a pressure vibration in an area of the chevron waveform (positive vibration waveform) is output to the first meter-out control valve 20 as a vibration control signal via the second adder 60. Upon receiving the vibration control signal, the first meter-out control valve 20 opens the first discharge line 16 so as to release a pressure generated in the rod side oil chamber 8*a* of the boom cylinder 8 and in the boom rod side line 24 to the tank line 11*a* via the first discharge line 16. On the other hand, the output signal that represents a pressure vibration in an area of the valley-shaped waveform (negative vibration waveform) is output to the first meter-in control valve 18 as a vibration control signal via the first adder 58. Upon receiving the vibration control signal, the first meter-in control valve 18 opens the first supply line 14 so as to supply pressure oil from the delivery line 10*a* to the boom rod side line 24 and the rod side oil chamber 8*a* via the first supply line 14.

The boom second control section 23 is provided with a similar vibration control circuit as the boom first control section 22. As in the case of boom first control section 22, while a trigger signal is output from the trigger signal output section 47, that is, during the given time T after the boom operating lever 48 is returned to the neutral position, the second meter-out control valve 21 opens to release a pressure to the oil tank 11 side when a pressure vibration generated in the head side oil chamber 8*b* of the boom cylinder 8 and in the boom head side line 25 becomes the chevron waveform (positive pressure), while the second meter-in control valve 19 opens to supply pressure oil when the pressure vibration becomes the valley waveform (negative pressure).

Figure 5:
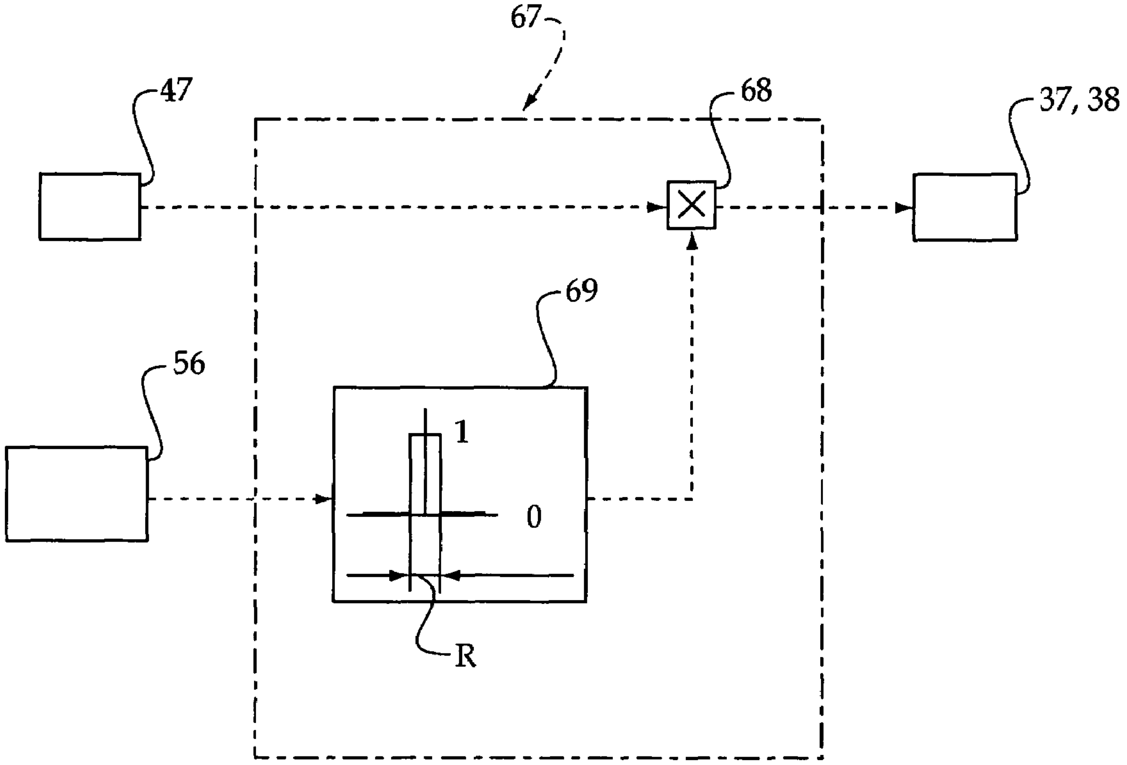
FIG. 5 is a block diagram of the trigger signal cut section according to the present disclosure wherein similar elements have similar numbers to FIGS. 2 through 4.

The stick first and second control sections 37 and 38 are also provided with a similar vibration control circuit, respectively. A trigger signal to the stick first and second control sections 37 and 38 receive the trigger signal via a trigger signal cut section 67. At the trigger signal cut section 67, a trigger signal from the trigger signal output section 47 is input in an integrator 68, while a command signal from the stick operating lever 56 is input in a function 69, as shown in FIG. 5. The function 69 outputs the positive logic value '1' when the stick operating lever 56 is in the neutral position or in the neutral dead zone R near the neutral position (in the neutral state), while outputting the negative value '0' when the operating lever 56 is operated to the outside of the neutral dead zone R (in the operating state). The output from the function 68 is integrated with the trigger signal at the integrator 68. When the output from the function 68 and the trigger signal is equally the positive logic value '1', that is while the stick operating lever 56 is in the neutral state during the given time T after the boom operating lever 48 is returned from the operating state to the neutral state, the positive logic value '1' is output from the integrator 68, which outputs the negative value ‘0’ otherwise. The output from the integrator 68 is then input in the vibration control circuits in the stick first and second control sections 37 and 38, respectively, as the trigger signal.

According to the vibration control circuits in the stick first and second control sections 37 and 38 when the trigger signal from the trigger signal cut section 67 is the positive logic value ‘1’, that is, while the stick operating lever 56 is in the neutral state during the given time T after the boom operating lever 48 is returned from the operating state to the neutral state, the first and second meter-out control valves 35 and 36 open to release a pressure to the oil tank 11 side when a pressure vibration generated in the rod or head side oil chambers 9*a* and 9*b* of the stick cylinder 9 and in the stick rod or head side lines 39 and 40 become the chevron waveform (positive pressure). On the other hand, the first and second meter-in control valves 33 and 34 open to supply pressure oil when the pressure vibration becomes the valley-shaped waveform (negative pressure).

The by-pass control section 46 is for outputting a control signal to the by-pass control valve 45 arranged in the by-pass line 44 as described above. At the by-pass control section 46, a command signal from the boom operating lever 48 and the stick operating lever 56 are input in an adder 63. The by-pass control section 46 controls the by-pass control valve 45 on the basis of the input command signals, so that the opening amount of the by-pass control valve 45 becomes maximum when both operating lever 48 and 56 are in the neutral state, and the opening amount gets smaller as the operating amount of the levers increase when at least either of the operating levers is in the operating state. According to the control of the by-pass control valve 45, delivery oil from the hydraulic pump 10 is by-passed through the by-pass line 44 to the oil tank 11 to place the hydraulic pump 10 in an unloaded state when both operating levers 48 and 56 are in the neutral state, while the delivery pressure of the hydraulic pump 10 is increased by closing the by-pass line 44 when at least either of the operating levers 48 and 56 is operated. At this time, the circuit maximum pressure of the delivery line 10*a* is set by a relief valve 64 for setting circuit pressure.

The by-pass control section 46 further includes a high-pressure signal output unit 65 and an integrator 66. The high-pressure signal output unit 65 outputs a signal that controls the opening of the by-pass control valve 45 so that the delivery pressure of the hydraulic pump 10 becomes a high pressure that is slightly lower than the circuit maximum pressure set by the relief valve 64. The output signal from the high-pressure signal output unit 65 is input into the integrator 66, which integrates the output signal from the signal output unit 65 and a trigger signal from the trigger signal output section 47, and outputs the integrated signal to the adder 63. When the trigger signal is the positive logic value ‘1’, that is during the given time T after the boom operating lever 48 is returned to the neutral position, the input signal from the high-pressure signal output unit 65 itself becomes the output signal from the integrator 66 to the adder 63. When the trigger signal is the negative logic value ‘0’, which occurs in a time duration other than the given time T after the boom operating lever 48 is returned to the neutral position, the input signal from the signal output unit 65 is blocked by the integrator 66. During the given time T after the boom operating lever 48 is returned to the neutral position, therefore, the output signal from the high-pressure signal output unit 65 is output to the by-pass control valve 45 as a vibration control signal via the integrator 66 and the adder 63. As a result, the hydraulic pump 10 is put under an open loop control to make its delivery pressure the high pressure slightly lower than the circuit maximum pressure. The hydraulic pump 10 supplies high-pressure oil to the boom cylinder rod side and head side oil chambers 8*a* and 8*b* and the stick cylinder rod side and head side oil chambers 9*a* and 9*b*. There a generated pressure vibration becomes the valley-shaped waveform via the first and second meter-in control valves 18, 19, 33 and 34, which are opened according to respective vibration control signal output.

INDUSTRIAL APPLICABILITY

In the above embodiment, oil supply and discharge control for the boom cylinder 8 and stick cylinder 9 is executed by respective first and second meter-in control valve and first and second meter-out control valve 18 to 21 and 33 to 36, which are incorporated in the boom valve unit 12 and the stick valve unit 13, respectively. Respective boom first and second control sections 22 and 23, and stick first and second control sections 37 and 38, output each control command to those control valves 18 to 21 and 33 to 36, and are provided with operating circuits and vibration circuits.

When each boom or stick operating lever 48 and 56 is operated, an operation signal is sent from the operating circuit of each control section 22, 23, 37 and 38 to each control valve 18 to 21 and 33 to 36. Receiving the operation signal, each control valve opens the supply or discharge lines 14 to 17 and 33 to 36, respectively, so as to supply or discharge oil at the valve opening amount corresponding to the operation of the operating levers 48 and 56. Thus the boom cylinder 8 and the stick cylinder 9 contract and extend in correspondence to the operation of the operating levers 48 and 56.

In such an arrangement, when the boom operating lever 48 is returned abruptly from the operating position to the neutral position to stop the boom 5, the output of the operating signal stops, which closes the first and second meter-in control valves 18 and 19 and the first and second meter-out control valves 20 and 21. This results in a sudden interruption of oil supply to and discharge from the boom cylinder 8, causing kinetic energy remaining in the boom cylinder 8 to generate a pressure vibration, which has a natural value determined by the compression of oil in the rod and head side oil chambers 8*a* and 8*b*, and the boom rod and head side lines 24 and 25, and by the inertia of the weight load W1 of the front work linkage 4 that acts on the boom cylinder 8. Meanwhile, the impact caused by the sudden halt of the boom cylinder 8 also generates a pressure vibration in the hydraulic circuit of the stick cylinder 9. Those pressure vibrations generated in the hydraulic circuits of the boom and stick cylinders 8 and 9 are detected by the first and second pressure detectors 26, 27, 42 and 43, respectively, and pressure signals are sent to the boom first and second control sections 22 and 23, and the stick first and second control sections 37 and 38, respectively.

During the given time T after the boom operating lever 48 is returned from the operating position to the neutral position, the trigger signal output section 47 outputs a trigger signal of the positive logic ‘1’ to the boom first and second control sections 22 and 23, and the by-pass control section 46. Meanwhile, the trigger signal of the positive logic ‘1’ is also output to the stick first and second control sections 37 and 38, during the given time T after the boom operating lever 48 is returned from the operating position to the neutral position, at which the stick operating lever 56 is in the neutral position.

Upon receiving the trigger signals of positive logic value ‘1’ from the trigger signal output section 47 and the pressure signals from the first and second pressure detectors 26, 27, 42 and 43, the vibration control circuits of the boom first and second control sections 22 and 23, and of the stick first and second control sections 37 and 38, send vibration control signals to the first and second meter-in control valves 18, 19, 33 and 34, and to the first and second meter-out control valves 20, 21, 35 and 36, respectively. According to the vibration control signals, when the pressure vibration generated in the rod and head side oil chamber 8*a* and 8*b* of the boom cylinder 8, the boom rod and head side lines 24 and 25, the rod and head side oil chambers 9*a* and 9*b* of the stick cylinder 9, and the stick rod and head side lines 39 and 40 become the chevron waveform (positive pressure), the first and second meter-out control valves 20, 21, 35 and 36 open to release a generated pressure to the oil tank 11 side to absorb the positive pressure of the pressure vibration to smooth it out. On the other hand, when the pressure vibration becomes the valley-shaped waveform (negative pressure), the first and second meter-in control valves 18, 19, 33 and 34 open to supply pressure oil to absorb the negative pressure of the pressure vibration to smooth it out.

Meanwhile, the by-pass control section 46 outputs a vibration control signal to the by-pass control valve 45 on the basis of an incoming trigger signal of the positive logic value '1' so as to make the delivery pressure of the hydraulic pump 10 the high-pressure slightly lower than the circuit maximum pressure. Then the hydraulic pump 10 supplies high-pressure oil to the boom cylinder rod and head side oil chambers 8*a* and 8*b*, the boom rod and head side lines 24 and 25, the stick cylinder rod and head side oil chambers 9*a* and 9*b*, and the stick rod and head side lines 39 and 40, where the generated pressure vibration becomes the valley-shaped waveform, via the first and second meter-in control valves 18, 19, 33 and 34, which are opened according to respective vibration control signal output.

Hence, according to this embodiment, the pressure vibration generated by the residual kinetic energy in the boom cylinder 8 is detected when the boom operating lever 48 is returned abruptly from the operating position to the neutral position. When the pressure vibration is positive, the resulted pressure is released via the first and second meter-out control valves 20, 21, 35 and 36. When the pressure vibration is negative, pressure oil is supplied via the first and second meter-in control valves 18, 19, 33 and 34. As a result, the pressure vibration is smoothed out, thus damped quickly as a whole. In this arrangement, the first and second pressure detectors 26, 27, 42 and 43 for detecting pressure vibrations, and the first and second meter-in control valves 18, 19, 33 and 34 and the first and second meter-out control valves 20, 21, 35 and 36, for absorbing pressure vibrations, are arranged separately for the rod side and the head side of the boom cylinder 8 and of the stick cylinder 9, respectively. Thus vibration control is executed separately for the rod side and the head side of each cylinder, respectively.

Figure 6:
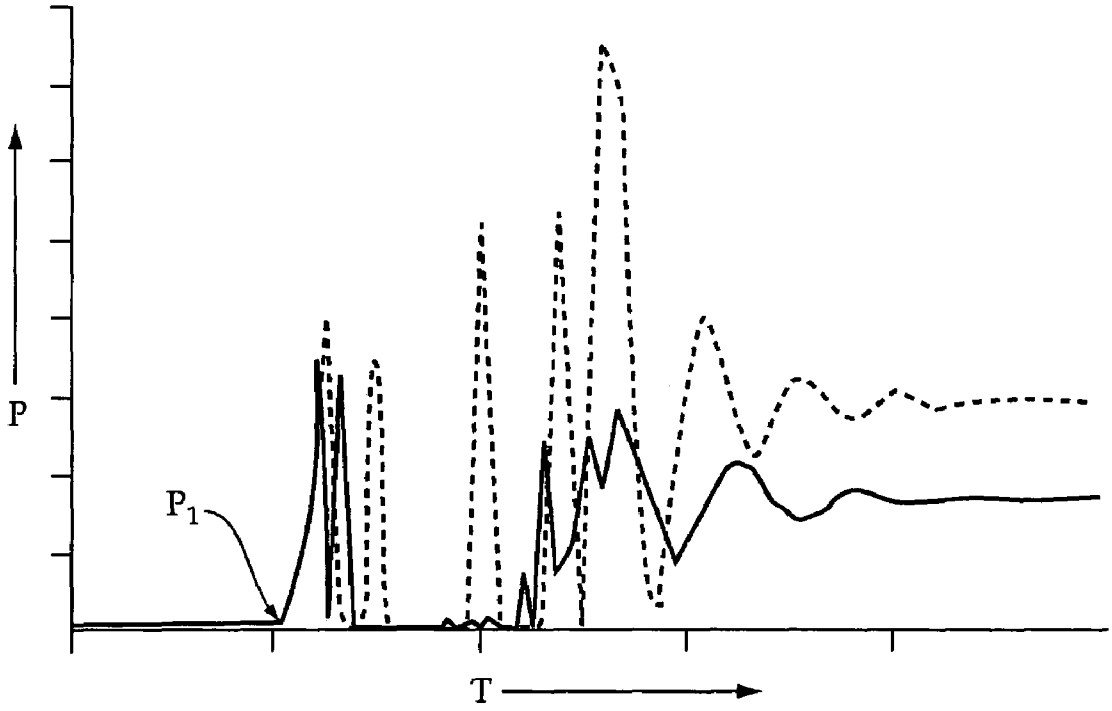
FIG. 6 is a characteristic diagram showing the damping state of a pressure vibration on the boom cylinder rod side according to the present disclosure.
Figure 7:
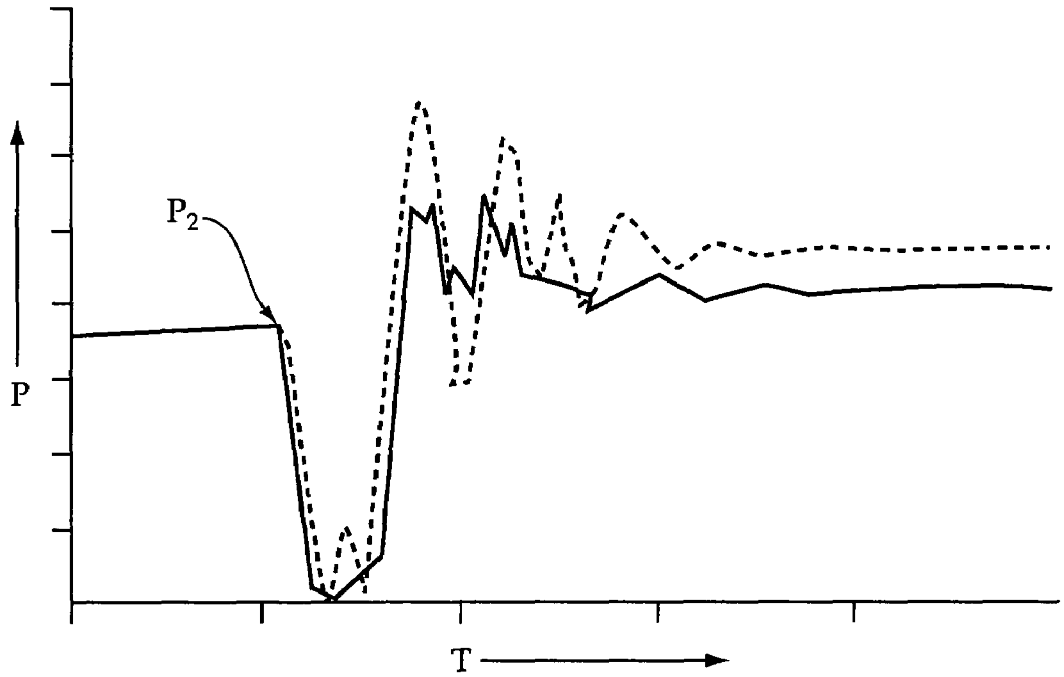
FIG. 7 is a characteristic diagram showing the damping state of a pressure vibration on the boom cylinder head side according to the present disclosure.

Accordingly, when the cycles or phases of respective pressure vibrations generated on the rod and head sides of the boom cylinder 8 and the stick cylinder 9 are different, vibration control is executed separately in response to each vibration at the rod side and head side to achieve effective vibration control for both sides. As shown in FIGS. 6 and 7, this enables quick damping of the pressure vibration and reduces spikes of pressure surges generated upon returning the boom operating lever 48 abruptly from the operating position to the neutral position. In FIGS. 6 and 7, the X axis represents time, whereas the Y axis represents pressure on the boom cylinder rod side and pressure on the boom cylinder head side, respectively, in FIGS. 6 and 7. Thus no unpleasant feeling due to the continuing pressure vibration is given to an operator, which contributes to better operability. In FIGS. 6 and 7, the solid line represents the damping state of a pressure vibration in a hydraulic control circuit in which the vibration control according to the disclosure is executed, while the dotted line represents the damping state of a pressure vibration in a hydraulic control circuit in which the vibration control is not executed.

In addition, according to the embodiment, the vibration control is executed in the hydraulic circuit of the stick cylinder 9 at the same time when the control is executed in the circuit of the boom cylinder 8. This is because a pressure vibration generated in the hydraulic circuit of the boom cylinder 8 is transmitted to the circuit of the stick cylinder 9 from the boom 5 via the stick 6 when the boom operating lever 48 is returned abruptly from the operating position to the neutral position. The point at which the boom operating lever is returned abruptly from an extension side to a neutral position is denoted with $P_1$ and $P_2$ in FIGS. 6 and 7 respectively. This simultaneous vibration control enables more effective damping of the pressure vibration, thus contributes further to the improvement of operability.

In this embodiment, the vibration control is executed when the boom operating lever 48 is returned to the neutral position. This is because the weight load W1 acting on the boom cylinder 8 is heavier than the weight load W2 acting on the stick cylinder 9, and a pressure vibration caused by abrupt return of the boom operating lever 48 to the neutral position is larger than that caused by a similar return of the stick operating lever 56. However, another application of the vibration control executed upon returning of the stick operating lever 56, can be easily achieved by providing a trigger signal generating unit that generates a trigger signal in response to the operation of the stick operating lever 56.

Also, according to the embodiment, the first and second meter-in control valves 18, 19, 33 and 34 open to supply pressure oil to the boom cylinder 8 and the stick cylinder 9 when the generated pressure vibration is negative. At this time, the delivery pressure of the hydraulic pump 10 is put under the open loop control to be the high-pressure slightly lower than the circuit maximum pressure according to the vibration control signal input in the by-pass control valve 45. The open loop control enables quick supply of enough pressure to compensate the negative pressure, which cancels the negative pressure in an early stage. The controlled high delivery pressure also eliminates as effectively as possible such a problem that the boom 5 or the stick 6 lowers due to a shortage in the flow rate of the oil that is supplied to the weight load holding side oil chamber of the boom cylinder 8 and of the stick cylinder 9 (the head side oil chamber 8*b* of the boom cylinder 8 and the rod side oil chamber 9*a* of the stick cylinder 9) when the vibration control is executed.

The vibration control is executed while the trigger signal of the positive logic value '1' is output, that is, during the given time T after the boom operating lever 48 is returned from the operating position to the neutral position, and is not executed otherwise. Accordingly, if a pressure vibration is detected, for example, when the boom operating lever is held in the operating position or in the neutral position, no vibration control signal is output to the control valves 18 to 21 and 33 to 36. This prevents such a problem that any of the control valves accidentally opens unnecessarily.

While the boom cylinder mounted on the hydraulic excavator as the fluid pressure actuator is described in this embodiment, the method and system of the disclosure can apply to a variety of hydraulic cylinders other than such a boom cylinder. The system and method is also applicable to a hydraulic motor, such as a revolving motor for revolving an upper revolving body, and is applicable not only to a hydraulic apparatus or machine, but also to one actuated by other pressurized fluids, such as air pressure.

What is claimed is:

1. A vibration control method for a fluid pressure control circuit having a plurality of actuators, wherein respective fluid channels for operating the actuators are provided with meter-in control valves for controlling fluid supply to the fluid pressure actuators and with meter-out control valves for controlling fluid discharge from the fluid pressure actuators, the method comprising the steps of:

controlling the meter-in control valves and meter-out control valves on the basis of an operation command from an operating lever to operate the fluid pressure actuators when the operating lever for the actuators is in an operating position;

detecting a pressure vibration generated in the respective fluid channels; and controlling the meter-in control valves and meter-out control valves to dampen the pressure vibration in the respective fluid channels when the operating lever is returned from the operation position to a neutral position.

2. The vibration control method for the fluid pressure control circuit according to claim 1, wherein, when the pressure vibration takes a waveform of a chevron shape, the meter-out control valves are controlled so as to release fluid pressure of a chevron-shaped waveform generated in the fluid channels for operating the actuators.

3. The vibration control method for the fluid pressure control circuit according to claim 1, wherein, when the pressure vibration takes a waveform of a valley shape, the meter-in control valves are controlled so as to supply fluid pressure of a valley-shaped waveform to the fluid channels for operating the actuators.

4. The vibration control method for the fluid pressure control circuit according to claim 3, the fluid pressure control circuit including a pump that is a fluid pressure supply source for the fluid pressure actuators, a by-pass line that starts from the pump to directly reach a tank without connecting to the fluid channels for operating the actuators, and a by-pass control valve for controlling a flow rate in the by-pass line;

wherein the method further comprises the step of controlling the delivery pressure of the pump on the basis of a flow rate control in the by-pass line by the by-pass control valve, which controls the delivery pressure of the pump so as to increase the fluid pressure supplied to the fluid channels for operating the actuators where the valley-shaped pressure waveform is generated when the operating lever is returned from the operating position to the neutral position.

5. The vibration control method for the fluid pressure control circuit according to claim 4, wherein the delivery pressure of the pump is put under an open loop control to be a high pressure close to a preset circuit maximum pressure when the operating lever is returned from the operating position to the neutral position.

6. The vibration control method for the fluid pressure control circuit according to claim 1, wherein the control of the meter-in control valves and meter-out control valves for dampening the pressure vibration is executed during a predetermined time after the operating lever is returned from the operating position to the neutral position.

7. The vibration control method for the fluid pressure control circuit according to claim 1, the fluid pressure control circuit including at least two fluid pressure actuators, the fluid channels for operating the actuators connected to respective fluid pressure actuators, and the operating levers for respective fluid pressure actuators;

wherein the method further comprises the step of controlling the meter-in control valve and meter-out control valve so as to detect a pressure vibration generated in the fluid channels for operating the actuators, and dampen the pressure vibration therein when the operating lever for one fluid pressure actuator is returned from the operating position to the neutral position while the operating lever for the other fluid pressure actuator is in the neutral position.

8. A vibration control system for a fluid pressure control circuit, the system comprising:

a plurality of fluid pressure actuators;

a plurality of fluid channels connecting to the fluid pressure actuators;

a plurality of operating levers, each one corresponding with a fluid pressure actuator;

a plurality of meter-in control valves and a plurality of meter-out control valves arranged in each of the fluid channels, wherein the meter-in control valves control fluid supply to the fluid pressure actuators while the meter-out control valves control fluid discharge from the actuators;

first and second operating circuits for controlling the meter-in control valves and meter-out control valves, respectively, to operate the fluid pressure actuators on the basis of an operation command from an operating lever when the corresponding operating lever is in an operating position; and first and second vibration control circuits for controlling the meter-in control valves and meter-out control valves, respectively, to detect a pressure vibration generated in the respective fluid channels, and dampen the pressure vibration in the respective fluid channels when the corresponding operating lever is returned from the operating position to a neutral position.

9. The vibration control system for the fluid pressure control circuit according to claim 8, in which respective fluid channels for operating the actuators are first and second fluid channels, which are each connected to first and second fluid inlet-outlets formed on the fluid pressure actuators, respectively; wherein the first and second fluid channels each include first and second supply lines and first and second discharge lines, respectively, the first and second supply lines are provided with first and second meter-in control valves, respectively, and the first and second discharge lines are provided with first and second meter-out control valves, respectively.

10. The vibration control system for the fluid pressure control circuit according to claim 9, in which each vibration control circuit comprises;

a trigger signal output means that outputs a trigger signal upon detecting the corresponding operating lever's returning from the operation position to the neutral position, a pressure vibration detecting means that detects a pressure vibration generated in the fluid channels for operating the actuators, and a control valve controlling means, which sends a vibration control command to at least one meter-out control valve so as to release a pressure via the at least one meter-out control valve when the detected pressure vibration has a waveform of a chevron shape, while sending a vibration control command to at least one meter-in control valve so as to supply fluid pressure via the at least one meter-in control valve when the detected pressure vibration has a waveform of a valley shape.

11. The vibration control system for the fluid pressure control circuit according to claim 10, wherein the trigger signal is output during a predetermined time after the corresponding operating lever is returned from the operating position to the neutral position.

12. The vibration control system for the fluid pressure control circuit according to claim 11, the fluid pressure control circuit including a pump that is a fluid pressure supply source for the fluid pressure actuators, a by-pass line that starts from the pump to directly reach a tank without connecting to the fluid channels for operating the actuators, and a by-pass control valve for controlling a flow rate in the by-pass line; wherein the delivery pressure of the pump is controlled on the basis of the flow rate control in the by-pass line by the by-pass control valve, and the fluid pressure control circuit is further provided with a by-pass control means that sends a vibration control command to the by-pass control valve so as to increase the fluid pressure supplied to the fluid channels where the valley-shaped pressure is generated when the operating lever is returned from the operating position to the neutral position.

13. The vibration control system for the fluid pressure control circuit according to claim 8, wherein, the fluid pressure control circuit is further provided with vibration control link means, which make the vibration control circuits for one fluid pressure actuator and another fluid pressure actuator operate in linkage when the operating lever for one fluid pressure actuator is returned from the operating position to the neutral position while the operating lever for the other fluid pressure actuator is in the neutral position.

14. The vibration control system for the fluid pressure control circuit according to claim 13, wherein at least two fluid pressure actuators, for which the vibration control circuits are made to operate in linkage by the vibration control link means, are actuators for swinging at least two respective members, which are coupled together in a mutually swingable manner to form a work linkage of construction machinery.

15. A work machine comprising:

an operator input device;

at least one hydraulic actuator;

a hydraulic control circuit connecting with said at least one hydraulic actuator;

at least one of a meter-in and a meter-out control valve disposed within said hydraulic control circuit to control a hydraulic fluid flow between said hydraulic control circuit and said at least one hydraulic actuator;

at least one operating circuit for controlling the at least one of a meter-in and a meter-out control valve based at least in part on a command from the operator input device when the device is in an operating position; and at least one vibration dampening control circuit for controlling the at least one of a meter-in and a meter-out control valve based at least in part on a value indicative of a fluid pressure vibration in said hydraulic control circuit when the operator input device is in a neutral position.

16. The work machine of claim 15 wherein:

the at least one hydraulic actuator comprises a linear actuator having a head side chamber and a rod side chamber;

the hydraulic control circuit comprises a supply line and a discharge line connecting with the head side chamber, and another supply line and another discharge line connecting with the rod side chamber;

the at least one of a meter-in control valve and a meter-out control valve comprises a plurality of meter-in control valves disposed one within each of the supply lines, and a plurality of meter-out control valves disposed one within each of the discharge lines to control hydraulic fluid supplied to and discharged from said at least one hydraulic actuator, respectively;

the at least one operating circuit comprises a meter-in operating circuit and a meter-out operating circuit for controlling the meter-in control valves and the meter-out control valves, respectively; and the at least one vibration dampening control circuit comprises a meter-in vibration control circuit and a meter-out vibration control circuit for controlling the meter-in control valves and the meter-out control valves, respectively.

17. The work machine of claim 16 wherein the linear actuator is a first linear actuator and the operator input device is a first operator input device, the work machine further comprising:

a second linear actuator fluidly connected with said pump via said hydraulic control circuit;

a second operator input device;

at least one of a meter-in and a meter-out control valve disposed within said hydraulic control circuit to control a hydraulic fluid flow between said hydraulic control circuit and said second linear actuator;

at least one additional operating circuit for controlling the at least one of a meter-in and a meter-out control valve based at least in part on a command from the operator input device when the device is in an operating position; and at least one additional vibration dampening control circuit for controlling the at least one of a meter-in and a meter-out control valve based at least in part on a value indicative of a fluid pressure vibration in said hydraulic control circuit when at least one of the first and second operator input devices is in a neutral position.

18. The work machine of claim 17 further comprising:

a trigger signal output means that outputs a trigger signal upon detecting returning of one of the first and second operator input devices from an operating position to a neutral position;

a pressure vibration detecting means coupled with the hydraulic control circuit; and a control valve controlling means configured to adjust at least one of the meter-out control valves responsively to a chevron-shaped vibration waveform, and configured to adjust at least one of the meter-in control valves responsively to a valley-shaped vibration waveform.

19. The work machine of claim 18 further comprising:

a low pressure tank;

a by-pass line connecting the pump with the low pressure tank;

a by-pass line flow control valve; and a by-pass control means configured to generate a vibration control command to the by-pass flow control valve responsively to a pressure vibration in the hydraulic control circuit; and vibration control link means linking the vibration control circuits associated with the first linear actuator and the second linear actuator.

20. The work machine of claim 18 wherein:

said control valve controlling means is configured to generate a vibration in said hydraulic control circuit responsively to a detected vibration; and a magnitude of summation of the generated vibration and detected vibration is less than a magnitude of the detected vibration.

* * * * *